(No Model.)
M. M. ROBBINS.
COFFEE AND PEANUT ROASTING ATTACHMENT FOR STOVES.
No. 274,225. Patented Mar. 20, 1883.
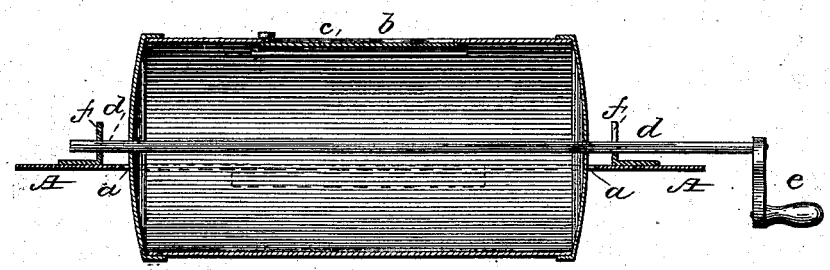
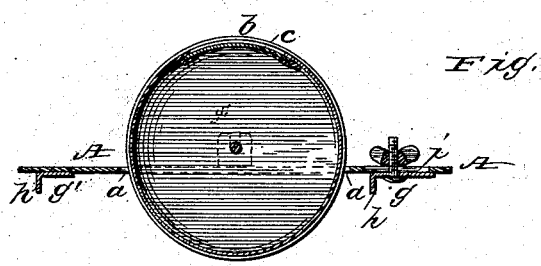
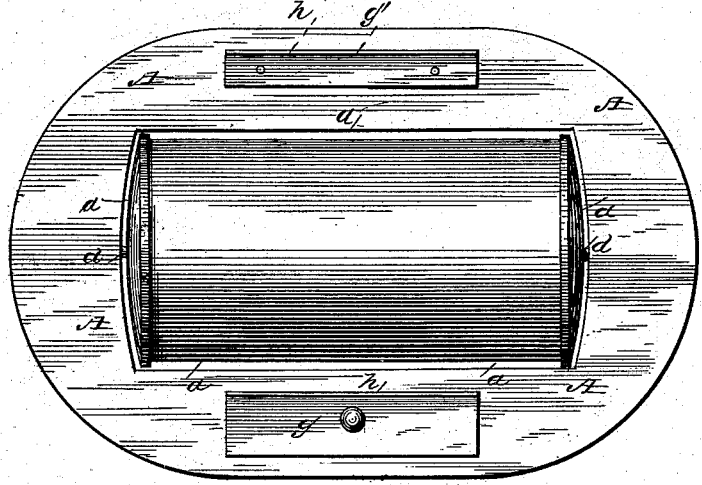
WITNESSES:
Fred. G. Dieterich
Charles H. Baker
INVENTOR,
Moses M. Robbins
by DeWitt C. Allen
ATTORNEY

UNITED STATES PATENT OFFICE.

MOSES M. ROBBINS, OF CENTREVILLE, INDIANA.

COFFEE AND PEANUT ROASTING ATTACHMENT FOR STOVES.

SPECIFICATION forming part of Letters Patent No. 274,225, dated March 20, 1883.

Application filed September 16, 1882. (No model.)

*To all whom it may concern:*

Be it known that I, MOSES M. ROBBINS, a citizen of the United States, residing at Centreville, in the county of Wayne and State of Indiana, have invented certain new and useful Improvements in Coffee and Peanut Roasting Attachments for Stoves; and I do hereby declare the following to be a full, clear, and exact description of the invention, such as will enable others skilled in the art to which it appertains to make and use the same.

This invention relates to certain new and useful improvements in coffee and peanut roasting attachments for stoves; and the invention has for its object the production of an attachment adapted to be applied to different-sized stoves; and to this end the invention consists in novel features of construction and combination and arrangement of parts, all as will be hereinafter fully described, and set forth in the claims hereto annexed.

Referring to the accompanying drawings, Figure 1 is a longitudinal vertical section of my improved attachment; Fig. 2, a central transverse vertical section; Fig. 3, a bottom view or plan.

In the drawings, A represents a metallic base-plate, provided with an oblong opening, *a*, through which the ordinary cylinder for containing the material to be roasted is placed, said cylinder having the usual receiving and discharging opening, *b*, closed by a sliding door, *c*. The cylinder is also provided with end journals, *d d*, one of which is provided with an operating crank or handle, *e*, said journals fitting in upwardly-projecting bearing *f f*, secured to the base-plate A, near its ends. This base-plate A is made wide enough to fit over the front opening of an ordinary cooking-stove when the usual three lids or covers are removed, and has secured on its under side, on opposite sides of its central opening, *a*, two metallic plates, *g g'*, with downwardly-projecting flanges *h h*, adapted to engage the inner edges of the stove for securing the base-plate A in position. The plate *g'* is rigidly secured in position on the plate, while the plate *g* is adapted to be adjusted inward or outward through the medium of a transverse slot, *i*, through said base-plate, and a screw-bolt or nut secured to plate *g*, and projecting up through the slot in base-plate, and provided with a thumb or other nut by which the plate *g* may be secured in any position to which it may be adjusted for securing the base-plate to a stove.

The above-described attachment, while being simple and cheap, can be applied to a No. 7, 8, or 9 or to any ordinary cook-stove, and the base-plate A, being flat, permits the cylinder to be let nearly one-half of its diameter down into the stove.

Having thus fully described my invention, what I claim as new, and desire to secure by Letters Patent, is—

The herein-described coffee and peanut roasting attachment for stoves, consisting of the flat base-plate A, having an oblong opening for the reception of the roasting-cylinder, and upwardly-projecting bearings for the journals thereof, and the adjustable and stationary plates *g g'*, connected to the under side of the base-plate, and having downwardly-projecting flanges *h h'*, adapted to engage the inner edges of a stove, whereby the attachment may be secured to stoves having different-sized openings, substantially as specified.

In testimony whereof I affix my signature in presence of two witnesses.

MOSES M. ROBBINS.

Witnesses:
 ELWOOD HUNT,
 L. D. CROOKS.